United States Patent
Smith et al.

(10) Patent No.: US 9,628,341 B2
(45) Date of Patent: Apr. 18, 2017

(54) INCORPORATING FDT/DTM TECHNOLOGY INTO A NATIVE CONTROL SYSTEM MONITORING APPLICATION

(71) Applicant: GE Intelligent Platforms, Inc., Charlottesville, VA (US)

(72) Inventors: Steven Smith, Salem, VA (US); Ashok Acharya, Salem, VA (US); George Matzko, Salem, VA (US)

(73) Assignee: GE INTELLIGENT PLATFORMS, INC., Charlottesville, VA (US)

( * ) Notice: Subject to any disclaimer, the term of this patent is extended or adjusted under 35 U.S.C. 154(b) by 378 days.

(21) Appl. No.: 13/906,581

(22) Filed: May 31, 2013

(65) Prior Publication Data

US 2014/0359459 A1    Dec. 4, 2014

(51) Int. Cl.
*G06F 3/00* (2006.01)
*H04L 12/24* (2006.01)
(Continued)

(52) U.S. Cl.
CPC ............ *H04L 41/22* (2013.01); *G06F 3/0481* (2013.01); *H04L 12/6418* (2013.01)

(58) Field of Classification Search
CPC ......... H04M 1/72519; H04M 2250/22; H04M 1/0256; H04M 1/21; H04M 1/72527; H04M 1/72536; H04M 2250/06; H04M 7/0027; G06F 3/0484; G06F 3/017; G06F 3/0488; G06F 3/0481; G06F 3/0482; G06F 3/0485; G06F 3/04817; G06F 3/04883; G06F 12/0238; G06F 12/0292; G06F 12/10; G06F 12/1027; G06F 17/30292; G06F 2212/7201

See application file for complete search history.

(56) References Cited

U.S. PATENT DOCUMENTS

| 7,983,892 B2 | 7/2011 | Anne et al. | |
|---|---|---|---|
| 2007/0079250 A1* | 4/2007 | Bump | G05B 23/0216 715/762 |

(Continued)

FOREIGN PATENT DOCUMENTS

KR    20110054370 A    5/2011

OTHER PUBLICATIONS

International Search Report and Written Opinion issued in connection with corresponding PCT Application No. PCT/US2014/036914 dated Sep. 16, 2014.

(Continued)

*Primary Examiner* — Di Xiao
(74) *Attorney, Agent, or Firm* — GE Global Patent Operation (57) ABSTRACT

Provided is a system including at least one server configured for executing one or more system level applications to manage first and second type system components. The first and second type system components are responsive to first and second type interface standards, respectively. The system also includes a graphical user interface (GUI) configured for displaying data associated with the first type system components in accordance with the first type interface standards. An application, representative of the second type system components, is displayed via the GUI in accordance with the first type interface standards.

17 Claims, 10 Drawing Sheets

(51) Int. Cl.
*G06F 3/0481* (2013.01)
*H04L 12/64* (2006.01)

(56) References Cited

U.S. PATENT DOCUMENTS

| | | |
|---|---|---|
| 2009/0049207 A1* | 2/2009 | Reynolds .......... H04L 12/40013 |
| | | 710/16 |
| 2009/0292995 A1 | 11/2009 | Anne et al. |
| 2010/0114334 A1 | 5/2010 | Krumsiek |
| 2012/0004743 A1* | 1/2012 | Anne et al. ..................... 700/83 |
| 2012/0079461 A1 | 3/2012 | Copass et al. |
| 2013/0232186 A1* | 9/2013 | Ingram ......................... 709/203 |

OTHER PUBLICATIONS

Shinichi Motoyoshi, "The Requirements for Device Integration and the Current Status," ICCAS-SICE, 2009, IEEE, Piscataway, NJ, Aug. 18, 2009, pp. 4583-4586.

Mitsuhiro Yamamoto et al., "FDT/DTM Framework for Field Device Integration," SICE Annual Conference, 2008, IEEE, Piscataway, NJ, Aug. 20, 2008, pp. 925-928.

copy of Ep Search Report issued Feb. 3, 2017 in connection to Ep Application 14803840.9.

* cited by examiner

INCORPORATING FDT/DTM TECHNOLOGY INTO A NATIVE CONTROL SYSTEM MONITORING APPLICATION

I. FIELD OF THE INVENTION

The present invention relates generally to intelligent field devices. More specifically, the present invention relates to facilitating control of intelligent field devices via a control system.

II. BACKGROUND OF THE INVENTION

Modern advancements in industrial plant operations include the use of field devices. Field devices control local plant operations such as collecting data from sensor systems, monitoring the local environment for alarm conditions, and actuating valves and breakers. The proliferation and evolution of digital communications has significantly enhanced the intelligence of these field devices.

In response to the increasing intelligence of field devices used in industrial plants, sophisticated device management systems have been developed to collect, process, optimize, and maintain information related to the field devices. These device management systems enable users to access the intelligent field devices through host system user interfaces or through dedicated terminals. The access permits the users to change settings and make other adjustments required to diagnose, maintain, and optimize performance of the field devices, their related components, and device networks.

As well known to those of skill in the art, a field device tool (FDT) interface specification, better known as FDT frame application architecture, exists to simplify and standardize control of intelligent field devices. An integral component of the conventional FDT frame application architecture includes a device type manager (DTM).

DTMs are provided by the intelligent field device vendor and delivered to customers along with the field device. The DTM is programmed to contain all of the information relevant to operation of its corresponding field device. The device DTM is the unique vendor supplied plug-in software used to access all information within the intelligent field device.

An instance of this vendor supplied software, however, must be created individually for each field device. Some device DTMs have a large memory footprint, which has led FDT Frame Applications to limit the number of device DTM instances active in memory and to cache the remaining ones, which causes severe performance degradation as system size increases and limits the display of live data to the currently selected device DTMs.

Another component integral to the FDT frame application is the fieldbus device. The FDT frame application and the associated DTMs typically represent only the specific fieldbus devices and fieldbus system networks they are connected to. Overall plant field device system network topology and system status is typically not represented in the FDT frame application. The exclusion of system network topology and system status from the conventional FDT frame application complicates overall system management from the user perspective.

Another deficiency within the conventional FDT frame application is that control systems are increasingly incorporating multiple fieldbus networks and third party devices into the plant field device system network. This presents the additional challenge of seamlessly managing the configuration of third party fieldbus devices along with the native devices.

Further complicating the picture is that conventional FDT technology provides a standardized framework that allows different fieldbus device types from any manufacturer to be configured and monitored from the FDT frame application. Using the FDT frame application requires building up the system topology using communication, gateway, and device DTMs to represent the system topology and facilitate the actual communication between the DTMs and the frame application. The standardized interface used to normalize the interaction between the frame application and the different types of DTMs imposes severe restrictions on the way the system topology is represented, the types of interactions that are allowed, and the way the DTMs are visualized.

III. SUMMARY OF EMBODIMENTS OF THE INVENTION

Given the aforementioned deficiencies, a need exists for methods and systems to more efficiently use FDT/DTM technology to optimize industrial control system applications, control and monitor health, and integrate the use of non-FDT devices into the control system applications.

Embodiments of the present invention provide a system including at least one server configured for executing one or more system level applications to manage first and second type system components. The first and second type system components are responsive to first and second type interface standards, respectively. The system also includes a graphical user interface (GUI) configured for displaying data associated with the first type system components in accordance with the first type interface standards. An application, representative of the second type system components, is displayed via the GUI in accordance with the first type interface standards.

One illustrious embodiment of the present invention provides a system configuration server that holds system topology information and the configuration information for all devices in the system. The system configuration server also holds the FDT project, and device information for each third party fieldbus device hosted, for example, by the ControlST system topology application from the General Electric Co (GE), of Schenectday, N.Y. the application launches an embedded FDT frame component against the preconfigure project, which includes the FDT gateway and communication DTMs to give the user online access to the target fieldbus device by simply selecting the device.

Another embodiment enables the use of DTMs to represent all physical elements of the control system and provides status information for each element. This allows the health of the entire control system to be viewed from an FDT frame application. By way of example and not limitation, the ControlST system topology application maintains the status of the non-fieldbus elements like personal computer (PC) workstations and controllers in a central data server, making it unnecessary for the DTMs to communicate directly with the control system elements that they represent. The DTMs communicate with virtual representations of the high level control system elements in order to read status data.

Yet another embodiment of the present invention integrates FDT technology into a native system level configuration application to provide seamless configuration management of third party fieldbus devices and native devices within a single system monitoring application.

One other illustrious embodiment of the present invention includes a hybrid device management application that provides a custom user experience driven by the system configuration. This hybrid device management application provides system level visualization and user interaction, while also capitalizing on the FDT standard to facilitate device level communications and device specific configuration and data display.

Aspects of the hybrid device management embodiments allow a custom view of all elements of the system topology to be represented, not just the FDT communication related elements. This approach also solves the performance issues that result in large systems when large numbers of DTM instances are created. The hybrid approach combines custom application functionality and performance with the standardized device configuration and monitoring provided by the FDT standard.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

V. DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
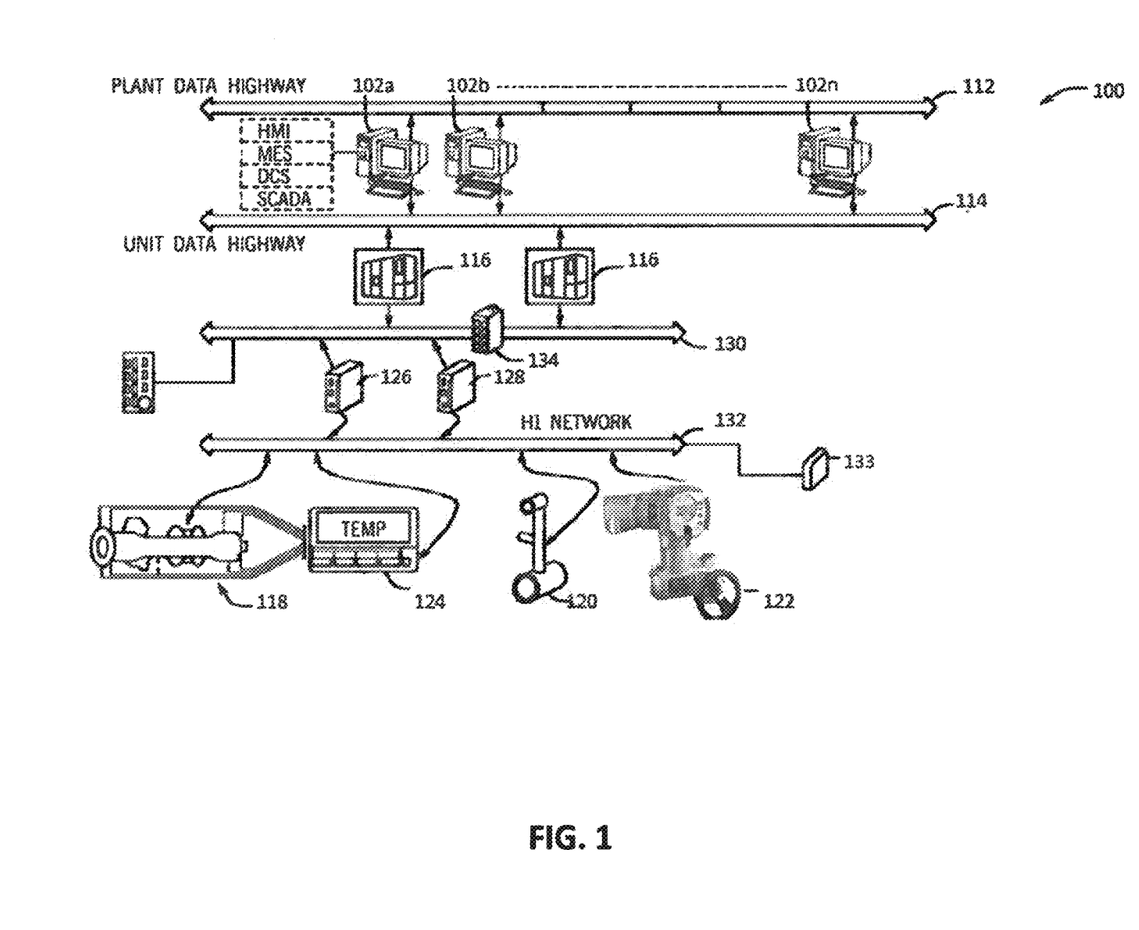
FIG. 1 is a schematic diagram of an exemplary industrial process control system environment in which embodiments of the present invention can operate.

By way of background, FIG. 1 is an illustration of an industrial process control system 100. The control system 100 includes a computer 102a for executing a variety of field device configuration and monitoring applications, and for providing an operator an interface for monitoring the components of the control system 100. The computer 102a can be any type of computing device suitable for running software applications.

Further, the computer 102a is communicatively connected to a plant data highway (PDH) 112 control network. The PDH 112 facilitates communication between the computer 102a and other computers 102b-102n in an industrial plant computer network. The computers 102a-102n can be further communicatively connected to a unit data highway (UDH) 114, suitable for communicatively coupling the computers 102a-102n to industrial controllers 116.

In the exemplary system 100, the computer systems 102a and 102b-102n can host programs such as an Ethernet global data (EGD) system configuration server, the ControlST engineering tool software application, control system health server, or similar programs.

In one illustrious embodiment of the present invention, the computer system 102a (i.e., configuration server) holds system topology and configuration information for all devices in the system. In this embodiment, for example, original (i.e., native) field devices, along with other equipment, can operate in accordance with the ControlST application. The computer system 102b, for example, can function as the control system health server—holding live operational data associated with all system components.

The system 100 can include industrial controllers 116. The industrial controllers 116 enable control logic useful in automating a variety of plant intelligent field devices such as a turbine system 118, a valve 120, and an actuator 122. The industrial controllers 116 can communicate with a variety of devices, including temperature sensors 124, flow meters, vibration sensors, and the like.

In FIG. 1, the turbine system 118, the valve 120, the actuator 122, and the temperature sensor 124 are communicatively interlinked to the automation controller 116 via linking devices 126 and 128 suitable for interfacing between an I/O net 130 and an H1 network 132. In some embodiments, the linking device 128 can be coupled to the I/O net through a switch 134.

A power supply 133 can be coupled to the network 132 and coupled to an AC or DC power source. The intelligent field devices 118, 120, 122, and 124 can also include support for communication protocols, such as those included in the HART® communications foundation (HCF) protocol, and the Profibus Nutzer Organization e.V. (PNO) protocol.

Although, as noted above, the computer system 102a configuration server can support native devices and their associated protocols using tools such as ControlST, the computer system 102a can also support devices that operate in accordance with the FDT frame application architecture.

Figure 2:
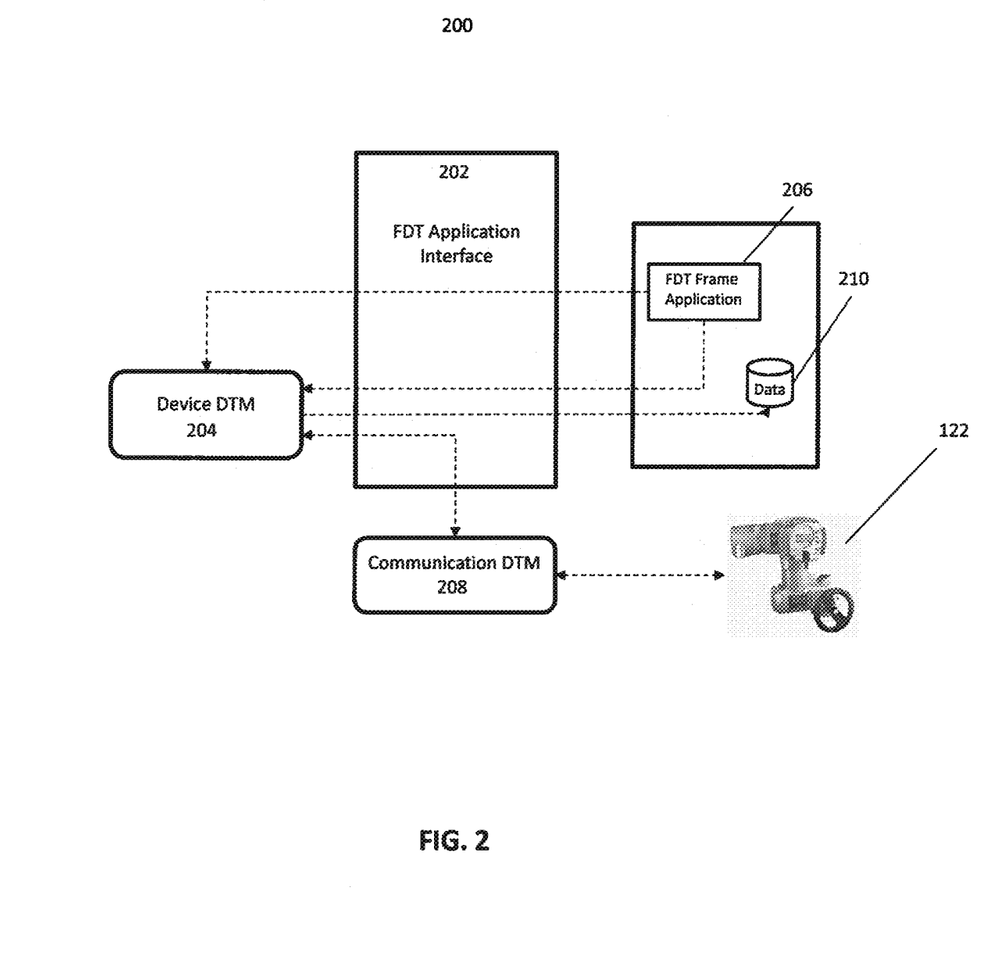
FIG. 2 is a high level block diagram illustration of a conventional FDT frame application architecture.

FIG. 2 is a high level block diagram illustration of a conventional FDT frame application architecture 200. The exemplary FDT architecture 200 includes an FDT interface 202. The FDT interface 202 enables communication between a vendor-supplied device DTM 204 and an FDT frame application 206, associated with one or more client projects. The device DTM 204 encapsulates all device-specific data, functions, and rules associated a target field device, such as the actuator 122 of FIG. 1.

Communication between the device DTM 204 and the actuator (i.e., target device) 122 occurs via a communication DTM 208. Relevant data associated with the DTM 204, as well as data associated with the specific client project, are stored in a database 210.

Very often, as noted above, FDT/DTM capable industrial plants will be required to use non-FDT field devices. Similarly, FDT/DTM capable field devices are routinely used in plants with non-FDT industrial control system. Each of these scenarios can be problematic to the efficient operation of the respective plants and devices. The inventors of the present application have addressed various aspects related to each of the scenarios.

Figure 3:
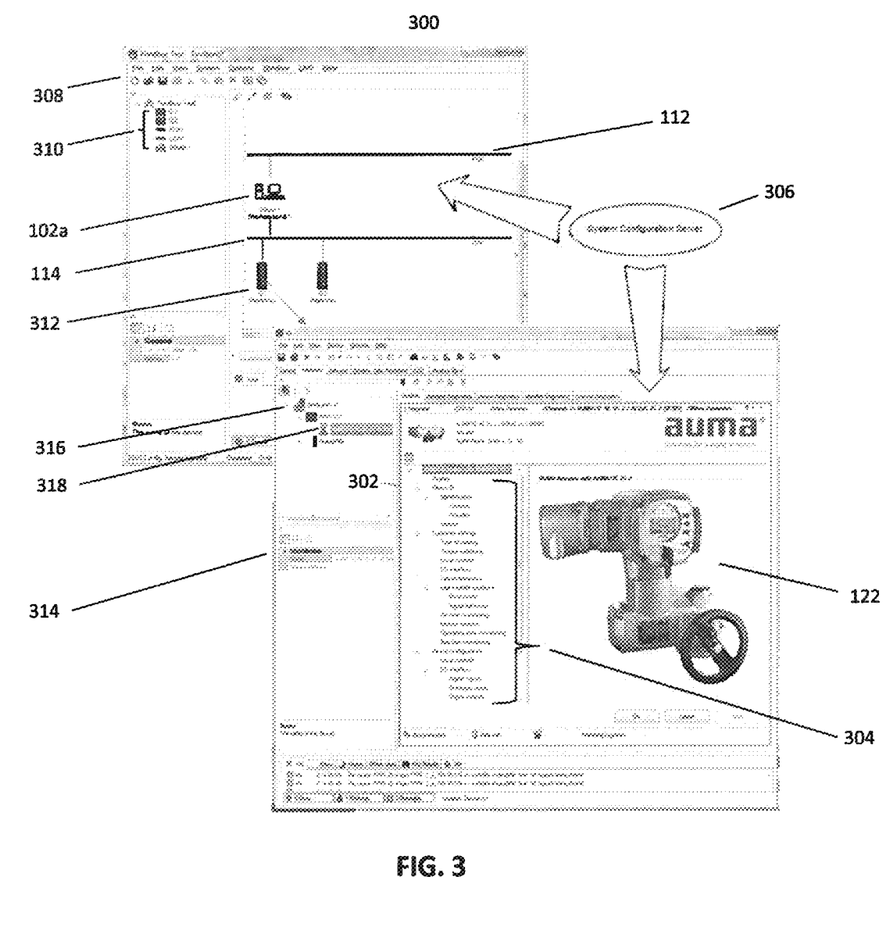
FIG. 3 is an illustration of an exemplary integrated device configuration management system constructed in accordance with an embodiment of the present invention.

FIG. 3 is an illustration of an exemplary integrated device configuration management system 300 constructed in accordance with an embodiment of the present invention. Aspects of the integrated device configuration management system (i.e., native) 300 are particularly applicable in situations, although not limited to, where FDT/DTM capable field devices are used in non-FDT industrial control systems. Elements of the native system 300 will be discussed in view of the industrial process control system 100 of FIG. 1.

More specifically, embodiments of the present invention, such as the illustration of FIG. 3, integrate FDT technology into native system-level configuration applications. This integration occurs by actually embedding the FDT technology frame application, along with associated project data and device DTM information, within the native system 300. This process provides for live and seamless configuration management of FDT/DTM (e.g., third party) fieldbus devices and non-FDT native devices.

The exemplary native system 300 is a non-FDT system configuration application using FDT capable target fieldbus devices, such as the fieldbus device 122. The fieldbus device 122 has an associated device DTM 302 that enables the user to control the configuration of the device 122.

That is, the DTM 302 provides the user with an ability to access, control, and change device-specific data, functions, and rules 304 associated with the fieldbus device 122. By way of example, the native system can be hosted by a configuration server 306 running on the computer 102a illustrated in FIG. 1.

In the exemplary system 300, a detail pane 308 functions as a graphical user interface (GUI) to enable the user to control all devices associated with and connected to the native system 300 at a system level.

In a conventional native system, a user would be unable to integrate a frame application, such as the DTM 302 into a system-level configuration that would be viewable via the detail pane 308. The DTM 302 would only be viewable in a standalone FDT frame application. In the embodiments, however, the native system 300 can provide a consistent, device manufacturer created view of the DTM 302, associated with the target fieldbus device 122, seamlessly within the system configuration application. The DTM 302, for example, can be viewed via the detail pane 308.

Integration of the device configuration, for example, the DTM 302 for the device 122, eliminates the need for the user to provide a separate application to configure the device 122 or examine the configuration data 304. The use of FDT technology ensures that the device level user interface and configuration data display in the system monitoring application are consistent with all other FDT frame applications or other applications incorporating FDT technology. All third party FDT devices, such as the device 122, can be seamlessly integrated into the system configuration application, such as the native system 300, using a generic interface that supports all bus types and devices that provide device DTMs.

FDT frame components include instances of the target device DTM 302 and any necessary communication and gateway DTMs in the detail pane of the system configuration tool when a fieldbus device is selected. As understood by those of skill in the art, a gateway DTM is used for routing between different protocols (i.e., from HSE to H1 protocol). Note: referring to FIG. 1—the PPRF module is the gateway device and it translates HSE messages it receives via the HSE network to device level protocol and sends the messages to the device on the H1 network.

The exemplary native system 300 can host FDT frame component and fieldbus device associated DTMs, such as the DTM 302 to communicate with the fieldbus device 122 and display the device configuration and status data 304 via the device DTM. The configuration and status data 304, along with specific project data, are stored within the configuration server 306.

By way of example, once the exemplary system 300 is activated, the user will be able to make changes to any device connected to the system 300 at the system level. When initiated, information within the detail pane 308, such as components 310, PDH 112, and UDH 114, etc., are viewable using a conventional native system. In this conventional native system, the user would have to switch tools and go to a different application to interact with an FDT/DTM capable device, such as the fieldbus device 122.

In the exemplary embodiment represented by the native system 300, however, the actual device DTM 302 is also viewable in the detail pane 308. In this manner, and with FDT frame components being accessible within the native system, the user is not required to take additional steps to communicate with an FDT/DTM capable device. In a user transparent manner, FDT communication can be established with the device 122 by seamlessly launching the DTM 302, within the native system 300.

The native system 300 hosts an FDT frame component and fieldbus device associated DTMs to communicate with fieldbus devices and display the device configuration and status data, such as the data 304, via the device DTM, such as the DTM 302.

As viewable within the detail pane 308 of FIG. 3, the native the system 300 includes a controller 312 (i.e., G1). Although the controller 312 is depicted as a MarkVie controller, the embodiments of present invention are not so limited. A more detailed view of attributes of the controller 312 is provided via a viewing pane 314.

As visible within the viewing pane 314, I/O modules 316 are included within the hierarchy of the controller 312 in the tree view. Although PPRF-533 I/O modules are depicted, the present invention is not so limited. Listed beneath the I/O modules is a product model representation 318 of the actual field device (actuator) 122.

By way of example, when the user selects the particular field device (actuator) 122, the device DTM 302 becomes visible. This visibility provides the user access to the device configuration and status data 304. Among other things, this information will enable the user to access and associate the correct FDT frame application with other device DTMs.

Figure 4:
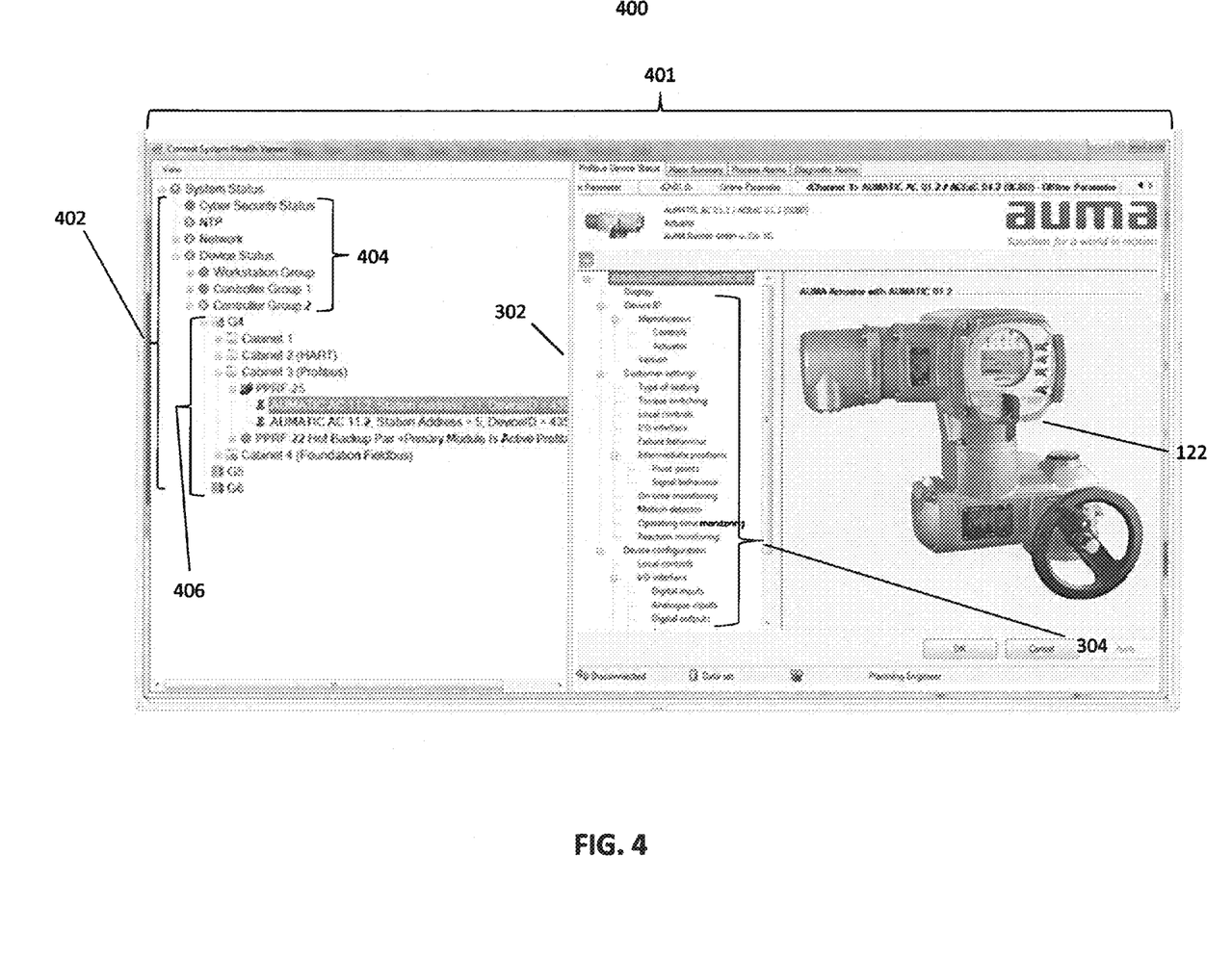
FIG. 4 is an illustration of an exemplary FDT/DTM based native control system monitoring device constructed in accordance with an embodiment of the present invention.

FIG. 4 is an illustration of an exemplary FDT/DTM based native control system monitoring device 400, constructed in accordance with another embodiment of the present invention. Among other things, the exemplary system 400 provides a user with live status information for an entire configuration management system, along with an ability to change the system configuration when desirable.

In the system 400, a viewing pane 401 includes a left-hand tree view including a detailed view of all system-level components 402. Within the system 400, the overall status of all system components such as networks, I/O modules, controllers, and/or devices etc. can be controlled and displayed.

For example, the overall status of devices, such as device the 122, is driven by a system topology application (i.e., native), such as the ControlST, discussed above with respect to FIG. 1. Live data can be stored and managed via a control system health server hosted on a computer, such as a computer 102b, described above. The user experience and data being displayed, via the view 401 or by way of a device DTM, such as the DTM 302, will be subject only to the native application. That is, the display of data will not be constrained by restrictions imposed, for example, by FTD frame application rules.

In the exemplary system 400, as in the case of the exemplary system 300 above, FDT frame components are only launched when a fieldbus device, such as the device 122, is selected. The system 400 can display a tree view of an entire system topology 402. For example, the system 400 can display the topology of all system level components 404: the networks, controllers, etc., and all other components necessary to facilitate communication with a device. The system 400, however, can also display the topology of actual devices 406. Within the FDT application, it's the actual devices (e.g., physical equipment) that users mostly desire to communicate with, monitored, and control.

The exemplary system 400 enables the user to communicate with, monitor, and control the topology, operation, and status of any system-level component, without any user interface and/or performance limitations inherent in FDT frame applications. In one embodiment, for example, the system 400 launches an FDT frame component at the device level to leverage the benefits of the device manufacturer's supplied device DTM running within the frame application without constraining the entire device management application to the FDT frame application limitations.

In the embodiment, the system level topology tree view 402 can show data for native system-level components and devices. Another pane, within the viewing pane 401, can display FDT device DTMs depending on what is selected in the system level topology tree view 402. In FIG. 4, for example, the FTD device DTM 302 and the topology tree view 402 are shown within the viewing pane 401.

Within the system 400, native system components and FDT device DTM's are displayed seamlessly and simultaneously without concern or observation of the underlying FDT technology enabling the fieldbus device displays.

Figure 5:
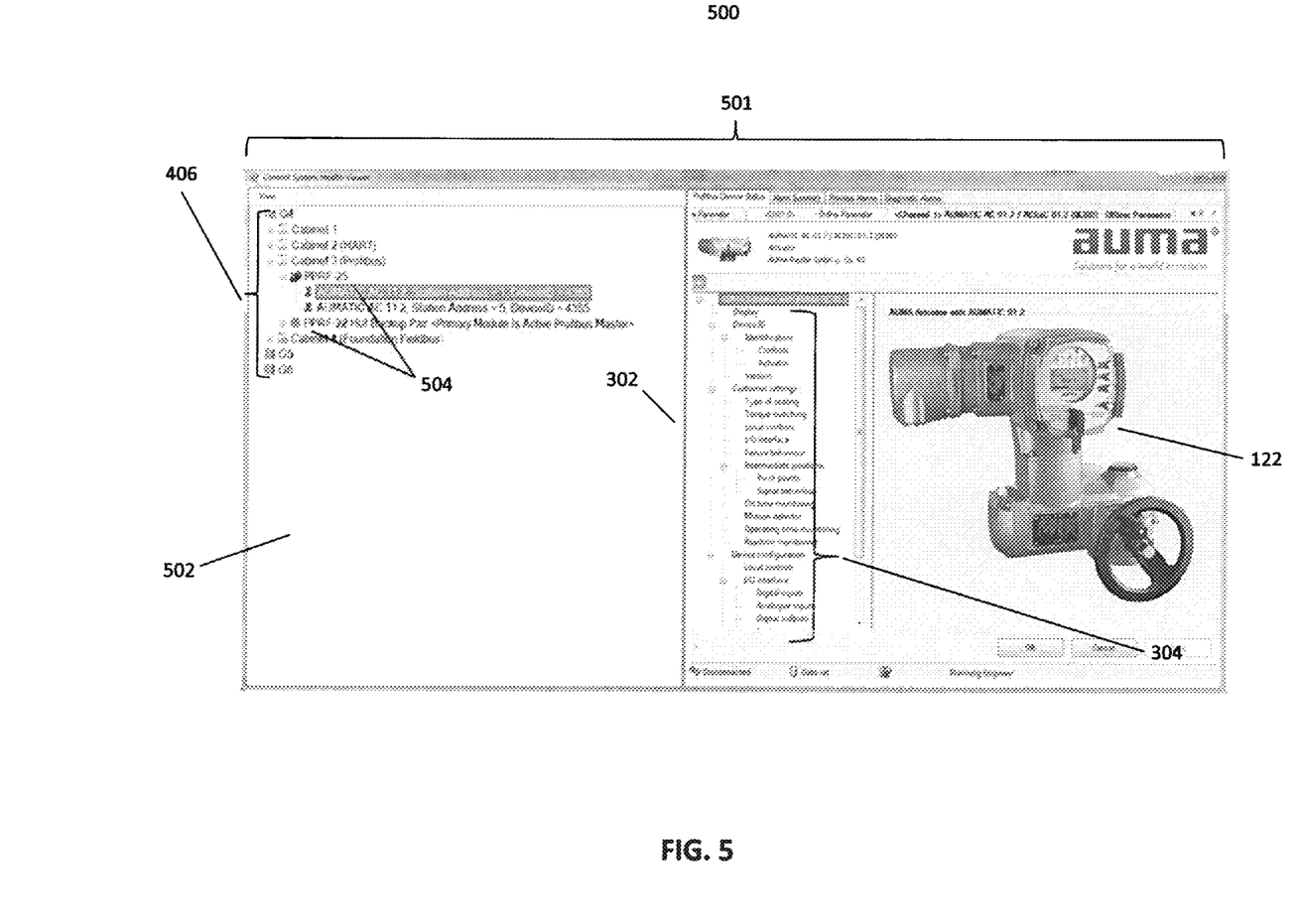
FIG. 5 is an illustration of an exemplary hybrid fieldbus device management constructed in accordance with another embodiment of the present invention.

FIG. 5 is an illustration of an exemplary hybrid fieldbus device management system 500, constructed in accordance with another embodiment of the present invention. In one example, the system 500 accommodates a native application that can host an FDT frame container component. The system 500 can also launch a standalone FDT frame application with a project configured to communicate with a target device. The native application provides the system topology and navigation within the system.

In the system 500, for example, the FDT frame application is invoked only when a device is selected to show the device specific parameters and values. The native application provides the user interface down to the device level and relies on FDT technology for the device level display and communication.

In FIG. 5, a system viewing pane 501 includes a left-hand tree view 406 including a detailed view of the topology of actual devices. The tree view 406 is visible within a viewing sub-pane 502. Additionally, overall, device status and live data 504 is shown within the tree view 406. By way of example, the topology, device status, and live data can be driven by the ControlST system topology application and the control health server, hosted on the computers 102a and 102b, discussed earlier. Within the viewing pane 502, the user experience and data being displayed is dictated by the native application. This display is not constrained by restrictions imposed by the FDT frame application rules, discussed more fully below. The FDT frame component is only launched when a fieldbus device is selected.

In the embodiment of FIG. 5, the native application launches the FDT frame component at the device level to leverage the benefits of the device manufacturer's supplied device DTM running within the FDT frame application. This approach avoids constraining the native application (i.e., device management application) to the FDT frame application limitations.

In the system 500, for example, the system level topology information 404, shown in FIG. 4, is internally generated and can be natively drawn and does not require the FDT framework. The system 500 can take an FDT frame application and indicate exactly what an FDT frame application will show, but can show it natively. The FDT components, such as the DTM 302, are only visible and invoked at the device level. In this manner, similar information can be shown in relation to non-FDT devices.

Thus, the control and displays associated with the system 500 are virtually FDT agnostic. The embodiments of FIG. 5 provide additional performance enhancements by eliminating the need to display all of the system-level communications level topology information 404 until absolutely necessary.

By way of background, conventional FDT technology is designed to address the interoperability issues associated with a diverse set of Fieldbus technologies and device manufacturers. The focus of FDT and the FDT frame application is on the actual devices. The FDT frame application, along with the DTMs it hosts, is created to facilitate the configuration and monitoring of individual field devices.

To provide this configuration and monitoring, the conventional FDT frame application provides a generic view of the system that is focused on the FDT communication elements. This generic view, however, does not necessarily represent the physical layout of the system. The FDT specification, and therefore the FDT frame application, provides a very limited, device communication focused set of behaviors that do not support any customization or vendor system specific features.

Additionally, the conventional FDT frame application must create instances of the communication hierarchy, from the communication DTM to the fieldbus gateway DTMs, down to the device DTMs. Many DTMs have a large memory footprint and impose significant performance limitations within the FDT frame application.

For example, most FDT frame applications limit the number of active DTM instances and must swap DTM instances in memory to compensate. Thus, frame application performance decreases as the system size grows, making it desirable to partition the system into smaller FDT frame application projects to maintain acceptable performance levels.

The exemplary hybrid fieldbus device management system 500, depicted in FIG. 5, resolves the aforementioned FDT deficiencies. The exemplary system 500 uses a native device management application to provide the user interaction with the elements of the system down to the device level. In the embodiments, the user interaction provides a custom user experience and a true representation of the system's topology.

The exemplary hybrid system 500 also solves the performance limitation issues related to the FDT frame application and DTMs. The hybrid approach allows the entire system topology to be represented without the performance issues introduced by the DTMs and only instances the DTMs associated with a particular device when needed.

Aspects of the exemplary hybrid system 500 also eliminate the need for manual configuration since it has access to the system topology data. In the conventional FDT frame application, for example, the user is required to build up the system topology by manually adding the necessary communication and fieldbus gateway DTMs. In the conventional system, the user must also add the device DTMs manually or via a scanning mechanism implemented in the gateway DTM.

Figure 6:
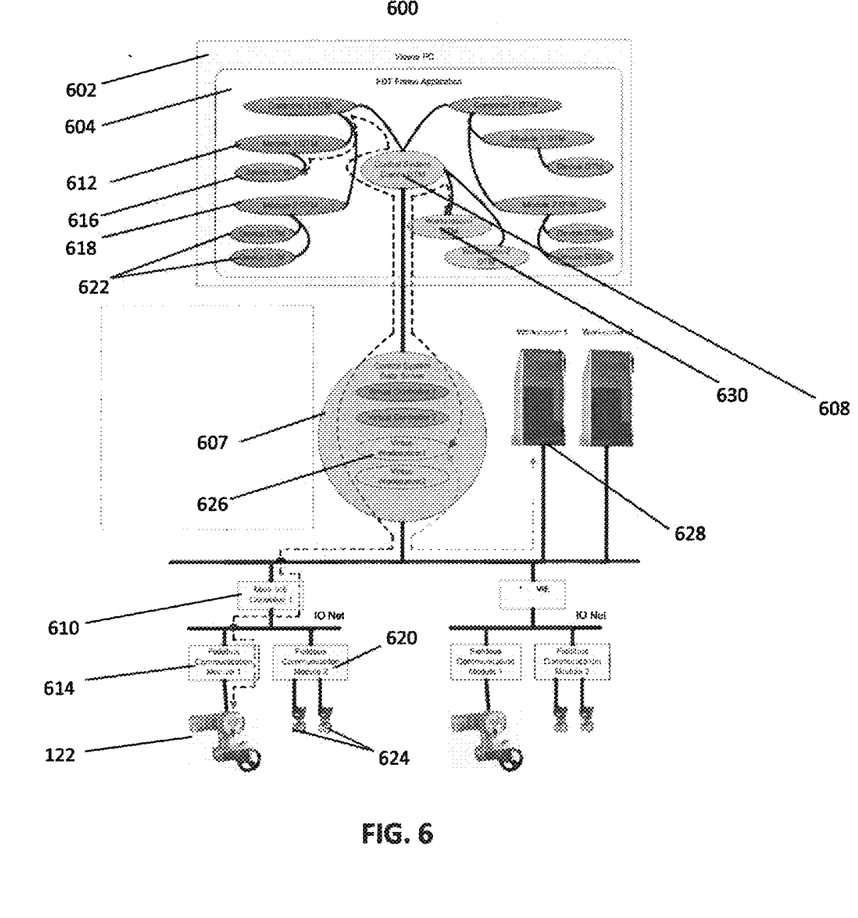
FIG. 6 is a block diagram illustration of a virtual FDT device management system constructed in accordance with an embodiment of the present invention.

FIG. 6 is a block diagram illustration of a virtual FDT system 600 constructed in accordance with an embodiment of the present invention. The system 600 is particularly well-suited, but not limited to, uses where FDT/DTM capable industrial plants are required to use non-FDT field devices.

The system 600 uses DTM's to represent all physical elements of the control system and provides status information for each element. This process allows the health of the entire control system to be viewed from a FDT frame application perspective. In the embodiments, a control application, such as the ControlST application, maintains the status of non-FDT elements like PC workstations and controllers in a central data server. This approach makes it unnecessary for the DTM's to communicate directly with the devices or control system elements they represent. The DTM's communicate with virtual representations of the high level control system elements in order to read status data.

More specifically, the exemplary system 600 includes a screen view 602 from a PC (not shown) depicting the control application during actual operation. The screen view 602 includes an open FDT frame application 604, a control system communications DTM 606, along with several other component DTM's.

In the system 600, a control system data server 607 routes DTM messages received from a control system communications DTM 608 and its target FDT capable device and routes the response back to the communications DTM 608 for routing back to its target component DTM. The control system data server 607 could be hosted, for example, on one of the computers 102b-102n discussed above with reference to FIG. 1.

By way of review, DTMs are produced by component vendors, are programmed to contain all of the information relevant to operation of a corresponding target component, and can be dropped into an FDT frame application to represent that target component. Thus, each of the component DTM's, depicted in the system 600, corresponds to an actual FDT capable target controller, module, and/or device.

For example, a controller 1 DTM 609 corresponds to a Mark VIE controller 610; a module 1 DTM corresponds to a fieldbus communication module 614; and a device DTM 616 corresponds to an actual physical device, such as the actuator 122. Similarly, a module to DTM 618 corresponds to a fieldbus communication module 620, and device DTM's 622 correspond to fieldbus devices 624, respectively. As will be discussed more fully below, not all components that are used within an industrial plant are FDT capable.

Although specific component types, device types etc., are referenced herein, such references are purely for purposes of illustration only. Many other component types, device types etc., are possible and would be within the spirit and scope of the present invention.

In the embodiments, and in the case of components that are not FDT capable, the control system data server 607 periodically reads data directly from the non-FDT capable components and maintains virtual components that holds the data and respond back to the component DTM requests. This approach allows components that are not FDT capable to be represented in the FDT frame application 604 via corresponding component DTM's without making them FDT capable.

The approach discussed above also relieves these non-FDT capable components of the burden of responding to FDT request from the component DTM's. In this manner, all elements of the system can be represented in the FDT frame application 604 without making higher-level components, like controllers and computers, FDT capable.

In the exemplary system 600, the control system data server 607 can host a virtual component representative of a non-FDT capable component. For example, the control system data server 607 depicts a virtual workstation 626 they represent an actual target user workstation 628. A workstation DTM 630 contains relevant topology, control, and status information related to the target workstation 628.

In the illustrious embodiment of FIG. 6, the exemplary system 600 provides a mechanism to integrate non-FDT components from different manufacturers, and display relevant information about these components within the single FDT frame application 604. Such a system would be applicable to, but not limited to, turbines, I/O devices, smart devices, and/or a host of other components and devices. Using the system 600, a user is permitted to control, monitor and configure these different components in one place using a single tool, such as and FDT application.

Another advantage of the exemplary system 600 is that it enables the leveraging of information already be gathered about non-FDT devices, such as the workstation 628. This available information can be used to create the virtual device, or workstation 626, enabling the creation of a corresponding DTM, such as the workstation DTM 630. In this example, as the DTM 630 is concerned, communicating with the virtual workstation 626 eliminates the need to communicate with the actual workstation 628.

Within the exemplary system 600, virtualization can be driven by the system configuration. For example, prior to activation, users might connect several non-FDT workstations and components to the system 600. The control system data server 607 would read each of these non-FDT workstations and components, and interpret whatever protocols are stored therein. The output of this process could be a language, or other mechanism, representative of the virtual device or its corresponding virtual DTM. Such languages and mechanisms are well known to those of skill in the art and will not be discussed herein. Once created, the user has the ability to access system status to control each of these non-FDT workstations and components as integrated FDT devices within the single FDT frame application 604.

By using virtual components as proxies to the actual control system components, is achieved in the exemplary system 600, computing and memory storage resources can be saved. Such savings ultimately improve system performance.

Figure 7:
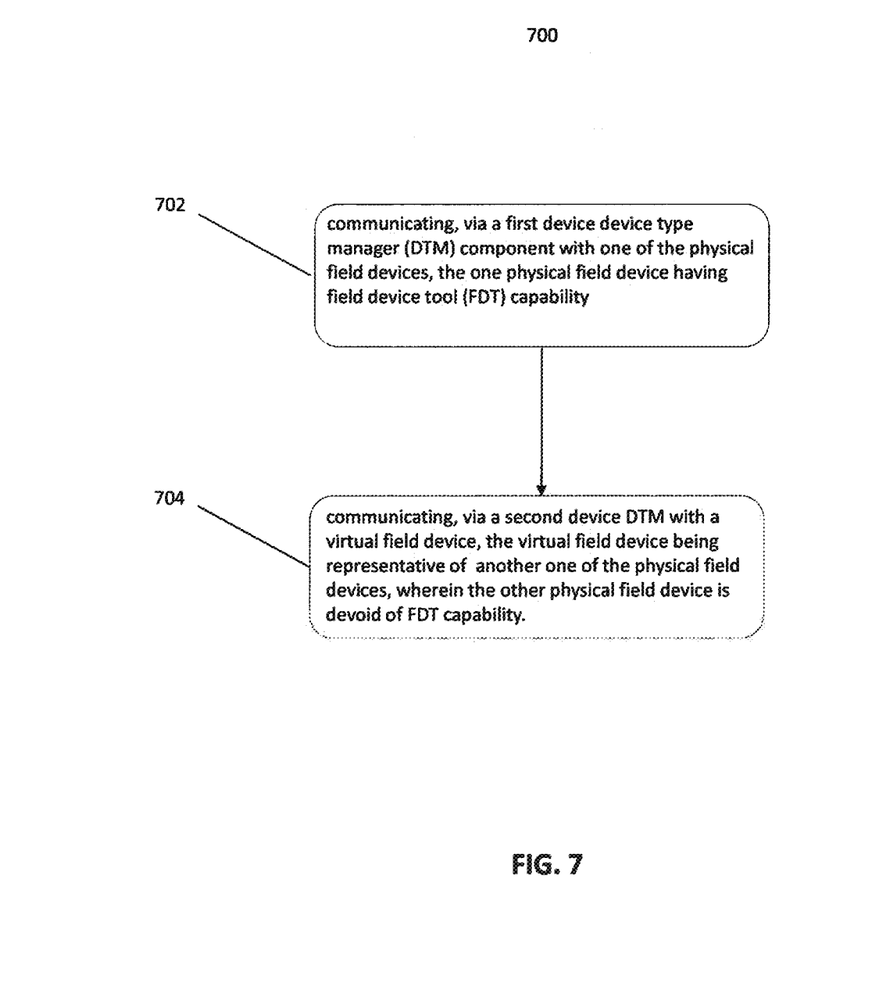
FIG. 7 is a flowchart of an exemplary method of practicing a first embodiment of the present invention.

FIG. 7 is a flowchart of an exemplary method 700 of practicing a first embodiment of the present invention. In the method 700, a step 702 includes communicating, via a first device DTM component with one of the physical field devices. The one physical field device has an FDT capability. In step 704 includes communicating, via a second device DTM with a virtual field device, the virtual field device being representative of another one of the physical field devices. The other physical field device is devoid of FDT capability.

Figure 8:
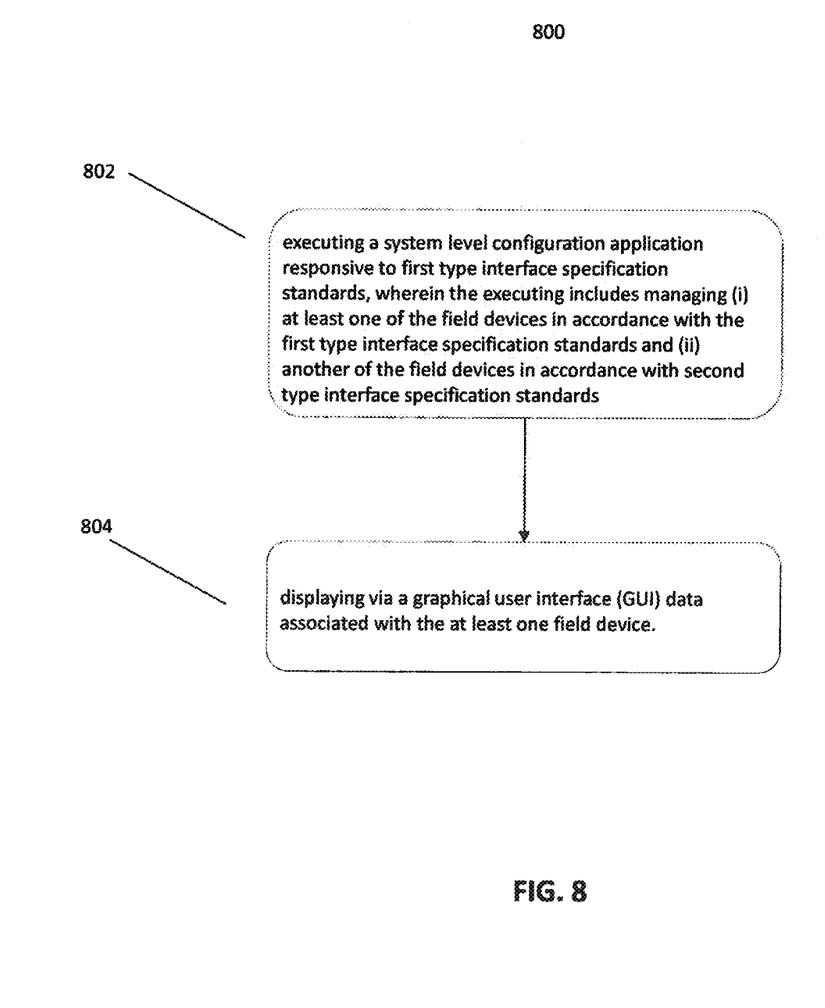
FIG. 8 is a flowchart of an exemplary method of practicing a second embodiment of the present invention.

FIG. 8 is a flowchart of an exemplary method 800 of practicing a second embodiment of the present invention. A step 802 includes executing a system level configuration application responsive to first type interface specification standards. The executing includes managing (i) at least one of the field devices in accordance with the first type interface specification standards and (ii) another of the field devices in accordance with second type interface specification standards. Step 804 includes displaying via GUI data associated with the at least one field device.

Figure 9:
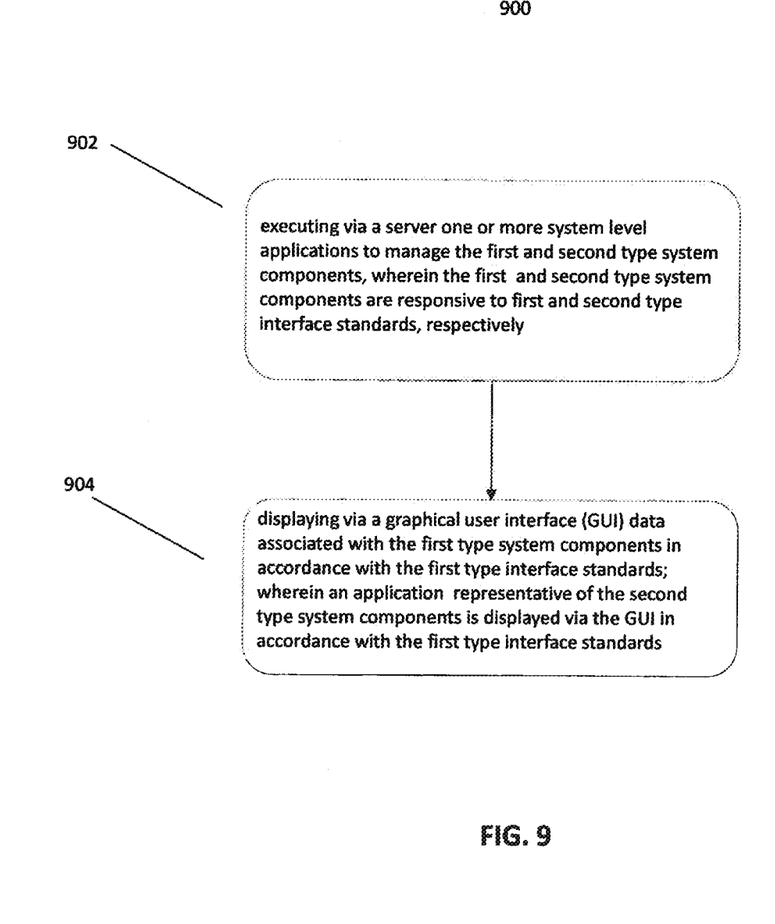
FIG. 9 is a flowchart of an exemplary method of practicing a third embodiment of the present invention.

FIG. 9 is a flowchart of an exemplary method 900 of practicing a third embodiment of the present invention. Step 902 includes executing via a server one or more system level applications to manage the first and second type system components. In step 902, the first and second type system components are responsive to first and second type interface standards, respectively. A step 904 includes displaying via GUI data associated with the first type system components in accordance with the first type interface standards. An application, representative of the second type system components, is displayed via the GUI in accordance with the first type interface standards.

Figure 10:
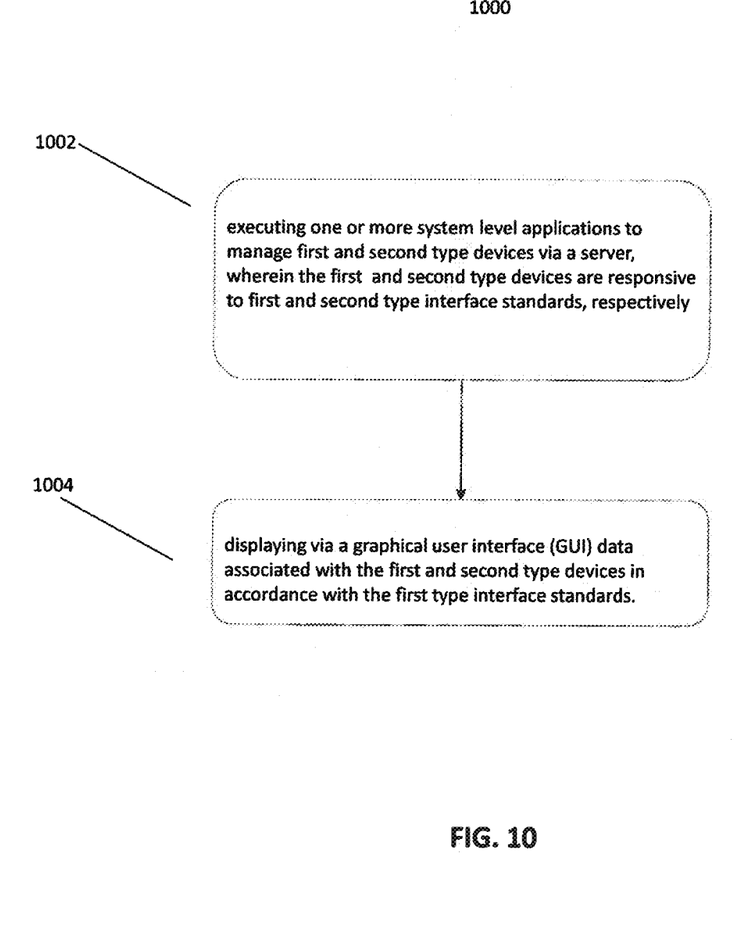
FIG. 10 is a flowchart of an exemplary method of practicing a fourth embodiment of the present invention.

FIG. 10 is a flowchart of an exemplary method 1000 of practicing a fourth embodiment of the present invention. In the method 1000, a step 1002 includes executing one or more system level applications to manage first and second type devices via a server. The first and second type devices are responsive to first and second type interface standards, respectively. In step 1004 includes displaying via a GUI data associated with the first and second type devices in accordance with the first type interface standards.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer system including an integrated field device system, the integrated filed device system comprising:
    a first type system component being non-field device tool (FDT) capable;
    a second type system component being field device tool (FDT) capable;
    a processor;
    at least one server configured for executing one or more system level applications to manage first and second type system components;
    a detail pane configured as a graphical user interface (GUI) for displaying data associated with each of the first type system components and the second type system component including a device manufacturer created view of a device type manager (DTM) for each of the first and second type system components;
    wherein the DTMs for each of the first and second type system components are embedded into a system configuration application;
    wherein the first and second type system components are responsive to first and second type interface standards, respectively; and
    wherein an application representative of the second type system components is displayed via the GUI in accordance with the first type interface standards.

2. The system of claim 1, wherein the at least one server includes a health server for managing live data and a configuration server for managing configuration data.

3. The system of claim 1, wherein the components include at least one from the group including networks, devices, turbine system, valve, actuator, HART® communications foundation (HCF) protocol enabled devices, Profibus Nutzer Organization e.V. (PNO) protocol enabled devices, fieldbus devices, virtual field device, and controllers.

4. The system of claim 1, wherein the data includes at least one from the group including configuration data and live data.

5. The system of claim 1, wherein the application includes a device type manager (DTM).

6. The system of claim 1, wherein the application representative of the second type system components is displayed when the second type component is selected.

7. The system of claim 6, wherein selecting the field device launches a field device tool (FDT) application.

8. The system of claim 7, wherein the FDT application includes an FDT frame component.

9. The system of claim 8, wherein the launching includes creating for display in the GUI an instance of at least one from the group including an FDT frame component, a communication DTM, and a gateway DTM.

10. The system of claim 9, wherein the FDT frame component is launched against the stored FDT project information.

11. A method for managing first and second type system components, comprising:
    executing via a processor one or more system level applications to manage the first and second type system components, the first type system component being non-field device tool (FDT) capable, the second type system components being field device tool (FDT) capable;
    displaying via detail pane configured as a graphical user interface (GUI) data associated with each of the first type system components and the second type system components including a device manufacturer created view of a device type manager (DTM) for each of the first and second type system components;

wherein the DTMs for each of the first and second type system components are embedded into a system configuration application; and wherein the first and second type system components are responsive to first and second type interface standards, respectively; and wherein an application representative of the second type system components is displayed via the GUI in accordance with the first type interface standards.

12. The method of claim 11, wherein the components include at least one from the group including networks, devices, turbine system, valve, actuator, HART® communications foundation (HCF) protocol enabled devices, Profibus Nutzer Organization e.V. (PNO) protocol enabled devices, fieldbus devices, virtual field device, and controllers.

13. The method of claim 11, wherein the data includes at least one from the group including configuration data and live data.

14. A non-transitory computer readable media storing instructions wherein said instructions when executed are configured to execute processes within a computer system, with a method for managing first and second type system components, comprising:

executing via a processor one or more system level applications to manage the first and second type system components, the first type system cdcomponent being non-field device tool (FDT) capable, the second type system components being field device tool (FDT) capable;

displaying via detail pane configured as a graphical user interface (GUI) data associated with each of the first type system components and the second type system components including a device manufacturer created view of a device type manager (DTM) for each of the first and second type system components;

wherein the DTMs for each of the first and second type system components are embedded into a system configuration application; and wherein the first and second type system components are responsive to first and second type interface standards, respectively; and wherein an application representative of the second type system components is displayed via the GUI in accordance with the first type interface standards.

15. The non-transitory computer readable media of claim 14, wherein the at least one server includes a health server for managing live data and a configuration server for managing configuration data.

16. The non-transitory computer readable media of claim 14, wherein the components include at least one from the group including networks, devices, turbine system, valve, actuator, HART® communications foundation (HCF) protocol enabled devices, Profibus Nutzer Organization e.V. (PNO) protocol enabled devices, fieldbus devices, virtual field device, and controllers.

17. The non-transitory computer readable media of claim 16, wherein the data includes at least one from the group including configuration data and live data.

* * * * *